US012584718B2

(12) United States Patent
Smith

(10) Patent No.: US 12,584,718 B2
(45) Date of Patent: Mar. 24, 2026

(54) EMBEDDED ELECTRONIC FIREWORK IGNITER

(71) Applicant: Cobra Firing Systems, Ganesvoort, NY (US)

(72) Inventor: Scott Smith, Gansevoort, NY (US)

(73) Assignee: Cobra Firing Systems, Gansevoort, NY (US)

( * ) Notice: Subject to any disclaimer, the term of this patent is extended or adjusted under 35 U.S.C. 154(b) by 0 days.

(21) Appl. No.: 18/662,047

(22) Filed: May 13, 2024

(65) Prior Publication Data

US 2025/0067547 A1 Feb. 27, 2025

Related U.S. Application Data

(60) Provisional application No. 63/578,035, filed on Aug. 22, 2023.

(51) Int. Cl.

| | |
|---|---|
| ***F42B 4/02*** | (2006.01) |
| ***F42B 3/12*** | (2006.01) |
| ***F42B 4/00*** | (2006.01) |
| ***F42B 4/24*** | (2006.01) |
| ***F42C 11/00*** | (2006.01) |
| ***F42C 15/42*** | (2006.01) |
| ***F42C 19/02*** | (2006.01) |
| ***F42C 19/12*** | (2006.01) |
| ***H01T 2/00*** | (2006.01) |

(52) U.S. Cl.

CPC .................. *F42B 4/02* (2013.01); *F42B 3/12* (2013.01); *F42C 11/00* (2013.01); *F42C 15/42* (2013.01); *F42C 19/02* (2013.01); *F42C 19/12* (2013.01); *H01T 2/00* (2013.01); *F42B 4/00* (2013.01); *F42B 4/24* (2013.01)

(58) Field of Classification Search

CPC ...... F42B 3/12; F42B 4/00; F42B 4/02; F42B 4/20; F42B 4/24; F42C 19/02; F42C 19/06; F42C 19/12; F42C 11/00; F42C 15/42; H01T 2/00

USPC ........... 102/335, 202.5, 202.7, 202.9, 202.14

See application file for complete search history.

(56) References Cited

U.S. PATENT DOCUMENTS 3,059,576 A * 10/1962 Haefner .................. F42B 3/198 102/202.14
3,134,329 A 5/1964 Zeman
(Continued)

FOREIGN PATENT DOCUMENTS

EP 0076746 B1 5/1986
WO 2007128203 A1 11/2007
WO WO-2025050138 A1 * 3/2025 ................ F42B 3/12

OTHER PUBLICATIONS

International Search Report and Written Opinion dated Feb. 14, 2025 for PCT/US2025/051180 filed Oct. 14, 2024; pp. 10.

*Primary Examiner* — James S Bergin
(74) *Attorney, Agent, or Firm* — Hoffman Warnick LLC

(57) ABSTRACT

A fuse-less ignition system for fireworks. An ignitor module is provided that is insertable into a firework and includes: a first end having an interface adapted to reside on an exterior surface of the firework for receiving a plug; a set of electrical contacts adapted to receive electricity from the plug; a heat element coupled to the electrical contacts and adapted to heat in response to received electricity; and a cavity adjacent to the heat element containing a pyrotechnic material, the pyrotechnic material adapted to ignite in response to a heating of the heat element.

20 Claims, 6 Drawing Sheets

(56) References Cited

U.S. PATENT DOCUMENTS

| | | | | |
|---|---|---|---|---|
| 3,227,083 | A * | 1/1966 | Moses | F42B 3/18<br>102/202.1 |
| 3,978,791 | A * | 9/1976 | Lemley | F42B 3/125<br>89/1.14 |
| 7,264,775 | B2 * | 9/2007 | Wilson | F42B 3/12<br>422/50 |
| 9,534,875 | B2 * | 1/2017 | Neyer | F42B 3/18 |
| 10,634,467 | B2 * | 4/2020 | Kim | F42B 3/124 |
| 11,709,037 | B2 * | 7/2023 | Wu | F42B 4/14<br>102/215 |
| 2015/0308805 | A1 | 10/2015 | Van Vliet et al. | |

* cited by examiner

EMBEDDED ELECTRONIC FIREWORK IGNITER

PRIORITY CLAIM

This application claims priority to provisional application Ser. No. 63/578,035, filed on Aug. 22, 2023, entitled EMBEDDED ELECTRONIC FIREWORK IGNITER, the contents of which are hereby incorporated by reference.

BACKGROUND

Traditionally, electronic firework firing systems utilize a pair of wires with a clip-on style fastener or the like (e.g., talon ignitors) that clips-on to a fuse of the firework. In operation, the firing system outputs an electrical charge that is delivered via the wires to a high resistance element within the fastener, which becomes heated and ignites the fuse of the firework.

SUMMARY

Aspects of the present invention provide an ignitor module insertable into a firework that eliminates the need for fuses and talons.

In one aspect, the ignitor module includes: a first end having an interface configured for exposure on an exterior surface of the firework, the interface configured for receiving a plug; a set of electrical contacts adapted to receive electrical current from the plug; a heating element coupled to the electrical contacts and adapted to convert electrical energy to heat energy in response to receiving electrical current; and a second end having an ignition element located adjacent to the heating element that includes a pyrotechnic material, the pyrotechnic material adapted to ignite in response to heat generated by the heating element.

In other aspects, the invention includes a firework with an ignitor module embedded therein. The firework includes: an ignitor module insertable into a firework, having: a first end having an interface configured for exposure on an exterior surface of the firework, the interface configured for receiving a plug; a set of electrical contacts adapted to receive electrical current from the plug; a heating element coupled to the electrical contacts and adapted to convert electrical energy to heat energy in response to receiving electrical current; and a second end having an ignition element located adjacent to the heat element that includes a pyrotechnic material, the pyrotechnic material adapted to ignite in response to heat generated by the heating element.

In a further aspect, an ignitor module insertable into a firework is provided that includes: a first end having an interface configured for exposure on an exterior surface of the firework, the interface configured for receiving a plug; a set of electrical contacts adapted to receive electrical current from the plug; a second end having a heating element coupled to the electrical contacts and adapted to generate heat in response to receiving electrical current; and wherein the heating element is configured to directly ignite pyrotechnic material in the firework.

In other aspects, the invention includes a firing system that includes a firing module, a set of wires, each connectable to the firing module on one end and have a plug on an opposite end; and a set of fireworks with ignitor modules embedded therein.

BRIEF DESCRIPTION OF THE DRAWINGS

These and other features of this disclosure will be more readily understood from the following detailed description of the various aspects of the disclosure taken in conjunction with the accompanying drawings in which.

Figure 1:
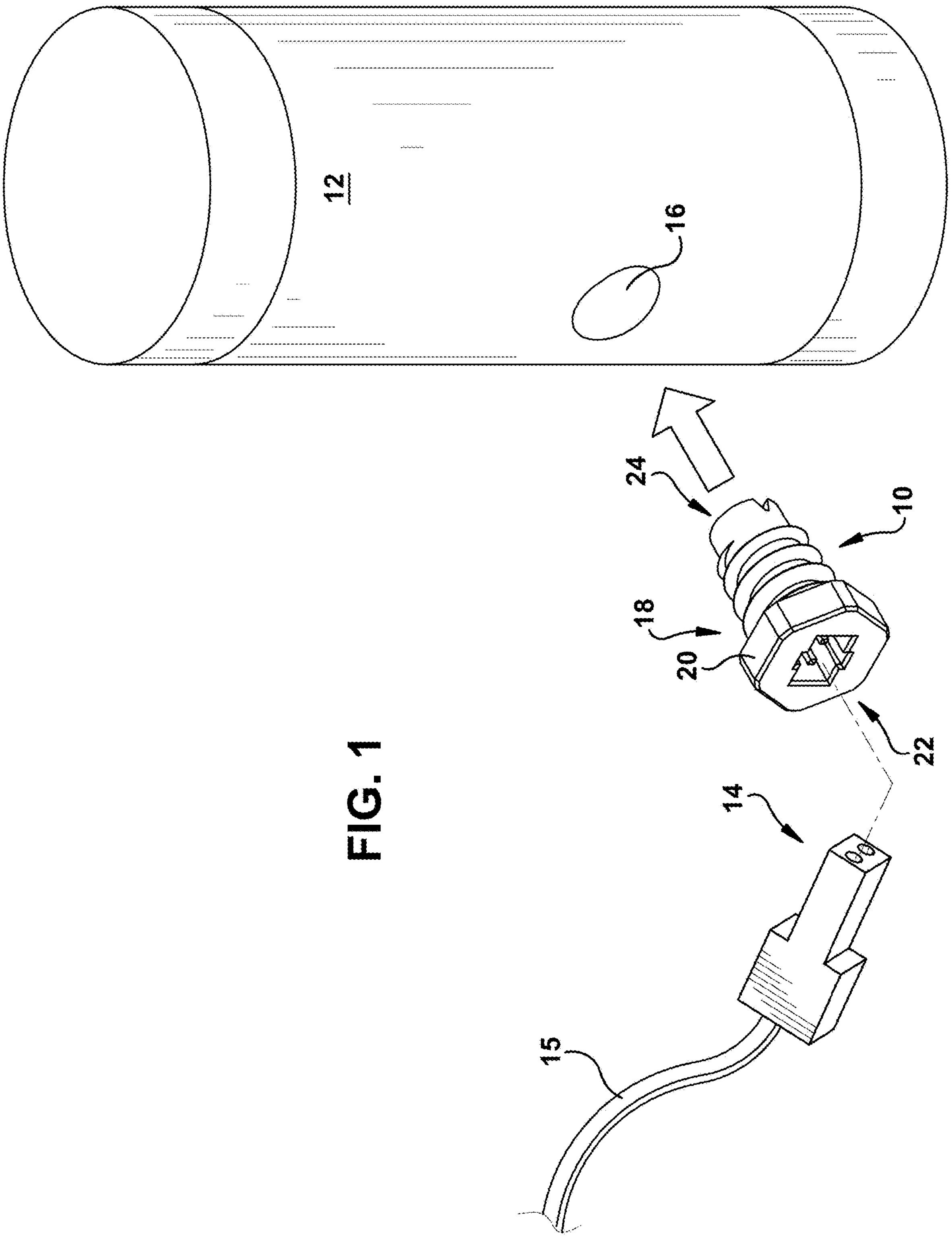
FIG. 1 shows an ignitor module, firework and plug according to embodiments.

The drawings are not necessarily to scale. The drawings are merely schematic representations, not intended to portray specific parameters of the disclosure. The drawings are intended to depict only typical embodiments of the disclosure, and therefore should not be considered as limiting the scope of the disclosure. In the drawings, like numbering represents like elements.

DETAILED DESCRIPTION

Aspects of this disclosure include a fuse-less igniter system for fireworks. In one embodiment, the system includes an igniter module that is insertable through a wall or surface of a firework and replaces or augments a traditional fuse. The igniter module generally includes (1) a first end configured for exposure on the exterior surface or wall of the firework and includes a connection interface (2) a second end that is inserted into the firework proximate the pyrotechnic material of the firework, and (3) an internal electrical igniter configured to ignite the pyrotechnic material of the firework in response to an electrical signal received via the connection interface. The connection interface is configured to accept a plug or the like that connects wires to electrical igniter within the ignitor module.

In various embodiments, the igniter module can be manufactured as part of or be integrated into the wall of the firework itself, e.g., as a cap, as the lower portion of the firework, etc.

FIG. 1 depicts an illustrative embodiment of an ignitor module 10 that is configured for insertion into a firework 12 at an access point 16, e.g., in a pre-drilled hole, a scored area, an opening or other type access point. It is envisioned that the ignitor module 10 can be inserted into a cardboard wall of the firework 12 at the time the firework is manufactured, or any time after it is manufactured (e.g., by a third party or a user). Furthermore, the particular location of the access point 16 on the firework 12 may be selected on the firework surface to most effectively ensure ignition of the firework 12.

In this embodiment, ignitor module 10 includes a threaded shaft 18, a hex bolt head 20, a connection interface 22, and an ignition element 24. The threaded shaft 18 and hex bolt head 20 are configured to allow the ignitor module 10 to be easily screwed into the firework 12 by rotating the hex bolt head 20, e.g., with a tool or by hand. With the ignitor module 10 inserted into the firework 12, plug 14 can be inserted into the interface 22 to deliver an electrical charge via wires 15 and cause the ignition element 24 to ignite the firework 12.

Figure 3:
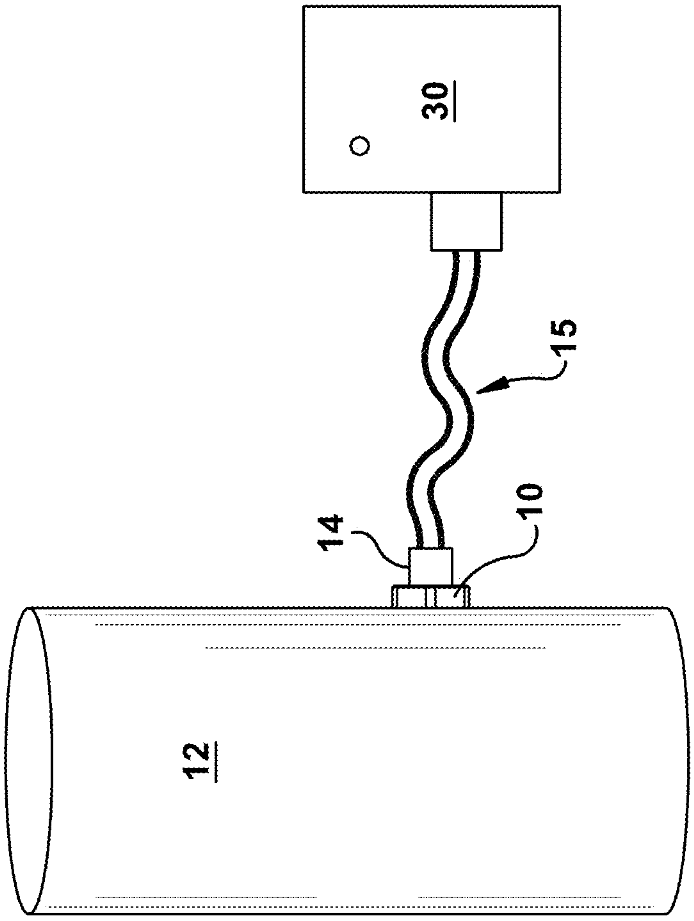
FIG. 3 shows a side view of the firework of FIG. 2 with a plug and firing module connected to the ignitor module according to embodiments.
Figure 2:
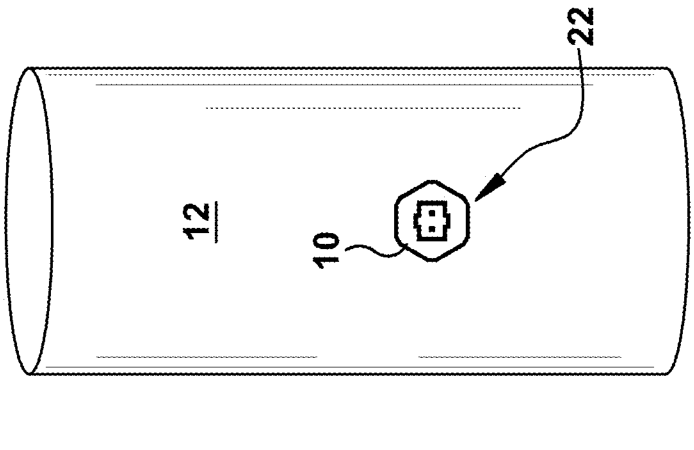
FIG. 2 shows a front view of a firework with an ignitor module installed therein according to embodiments.

FIG. 2 shows a front view of the ignitor module 10 inserted into firework 12 with the connection interface 22 exposed on the surface of the firework 12. FIG. 3 depicts a side view of ignitor module 10 installed in firework 12. Also shown in FIG. 3 are plug 14 installed in interface 22 (not shown), wires 15 and a firing module 30. As shown, the wires 15 are configured to plug into the firing module 30 at a first end and the ignitor module 10/firework 12 at the other end. Firing module 30 may for example include multiple ports for connecting to multiple fireworks (not shown) and be remotely controlled by an App running on a smart device or some other type of master control system used in the industry. When instructed, the firing module 30 delivers an electrical current over the wires 15 to the ignitor module 10, which ignites the firework 12.

Figure 6:
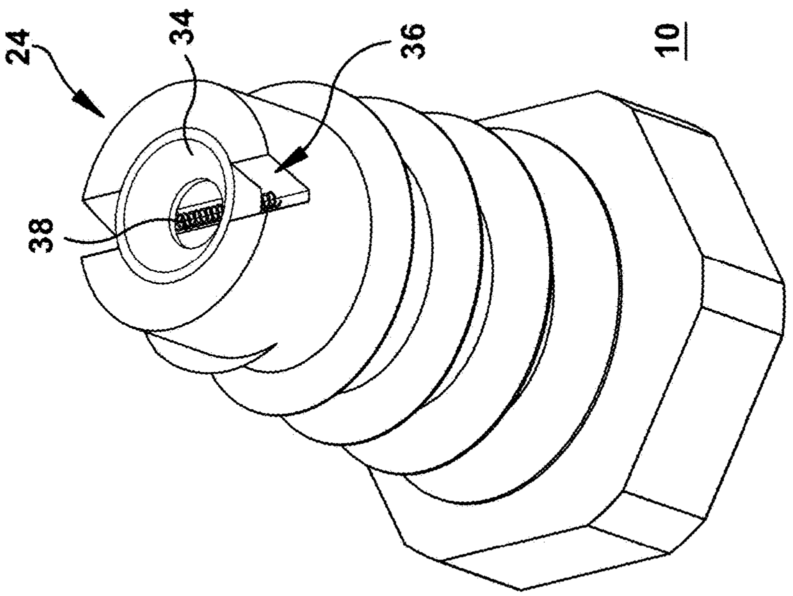
FIG. 6 shows a further isometric view of the ignitor module of FIG. 4 according to embodiments.
Figure 5:
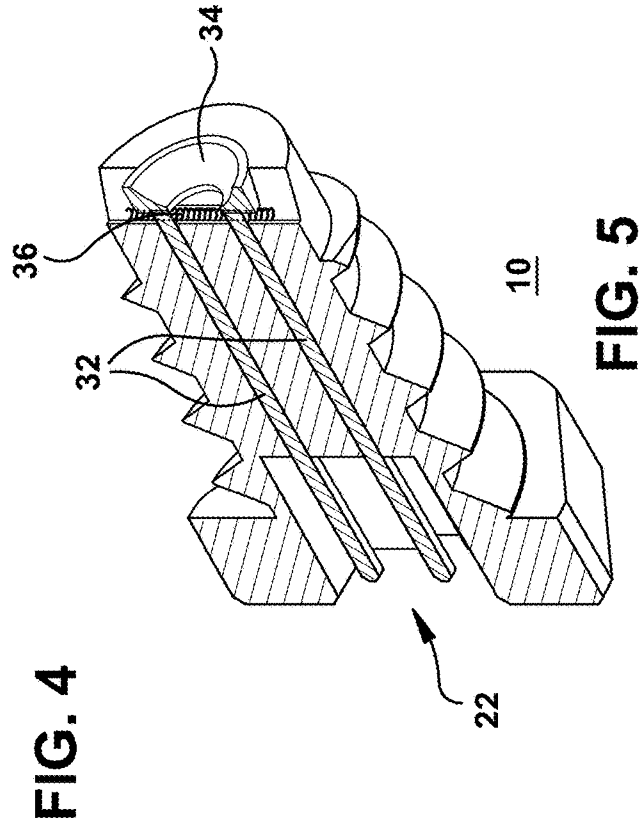
FIG. 5 shows a side cutaway view of the ignitor module of FIG. 4 according to embodiments.
Figure 4:
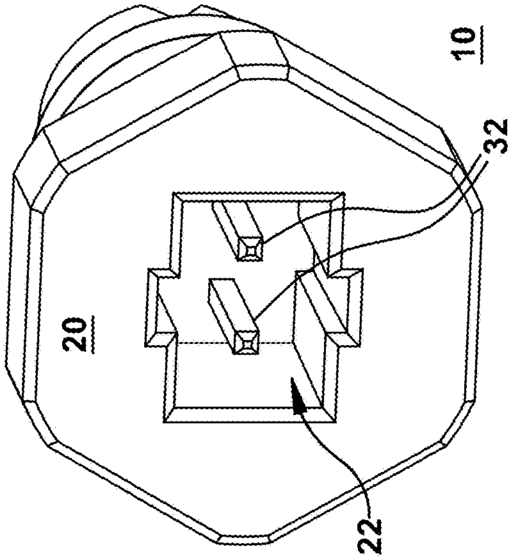
FIG. 4 shows an isometric view of an ignitor module depicting details of a connection interface according to embodiments.

FIGS. 4-6 depict various views of the ignitor module 10, which in this embodiment is manufactured in a hex bolt configuration. FIG. 4 depicts an isometric view of the ignitor module 10 showing the connection interface 22, with two electrical contacts, in this case exposed metal "male" pins 32 configured to mate with female receptacles in the plug 14. In certain embodiments, plug 14 may be releasably attachable to the interface 22 so that it can be readily installed and removed, e.g., by pressing a spring-loaded button. In other approaches, the plug 14 may mechanically snap or twist into the interface 22 in a predefined orientation to lock the plug 14 in place. In other aspects, non-mechanical electrical contacts may be utilized, such as a magnetic connection.

It is understood that any interface and plug configuration may be utilized to create a stable electrical connection with a set of (i.e., one or more) electrical contacts in the ignitor module. For example, in an alternative embodiment, male pins may be implemented within the plug 14 and female receptacles may be implemented within the interface 22. In another embodiment, rather than using a pin and receptacle configuration, electrical connections may be achieved with metal contacts that align on each of the plug 14 and interface 22. In other embodiments, electrical connections may be implemented via electrical induction. Accordingly, it is understood that any system for providing an electrical connection between plug 14 and interface 22 may be utilized.

FIG. 5 depicts a cutaway side view of module 10 and FIG. 6 depicts an isometric view showing the ignition element 24 of module 10. As shown, metal pins 32 (i.e., electrical contacts) extend from the interface 22 through module 10 and contact a heat element 36, e.g., a coiled tungsten wire. In one embodiment, two ends of the coiled tungsten wire are molded into a plastic bolt configuration, with each end of the wire being in contact with a second end of a respective pin 32. In this embodiment, the ignition element 24 includes a bowl-shaped cavity 34 with an opening 38 that is exposed to a center portion of heating element 36. Cavity 34 is filled with a pyrotechnic material (not shown), such as a putty-like black powder. When an electrical current is passed through the metal pins 32, the heating element 36 (e.g., tungsten wire) heats up to a red-hot state, igniting the pyrotechnic material. The ignited pyrotechnic material in turn lights and triggers the firework's initial effect.

It is understood that while the ignition element 24 is described using a bowl-shaped cavity with pyrotechnic material residing therein, alternative embodiments of ignition element 24 may be utilized. For example, a container (e.g., bag) of pyrotechnic material such as gun powder may be affixed to the end of module 10 proximate heating element 36. In other cases, a fuse may be integrated into the end of module 10, e.g., string or other material coated with a dried slurry of black powder and glue that can be ignited by heating element 36. In still other cases, some or all of the material that forms module 10 may be manufactured from an ignitable material, which can be ignited by heating element 36.

Figure 7:
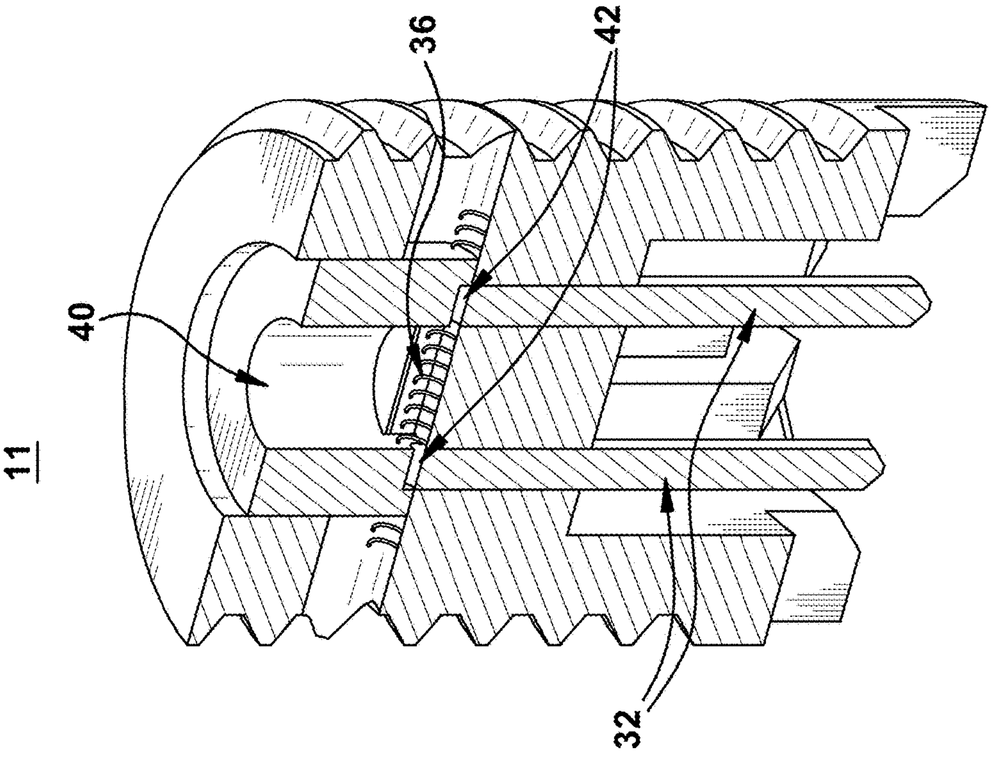
FIG. 7 shows a isometric view of an alternative ignitor module according to embodiments.

FIG. 7 depicts an alternative configuration of an ignitor module 11 in which the ignition element 24 includes a tubular shaped cavity 40 that is exposed to heating element 36. Like the embodiment shown in FIGS. 4-6, pins 32 extend through the module from the interface 22 to the heating element 36. Tubular shaped cavity 40 likewise contains pyrotechnic material (not shown) that ignites when the heating element gets hot, in response to an electrical current.

Figure 8:
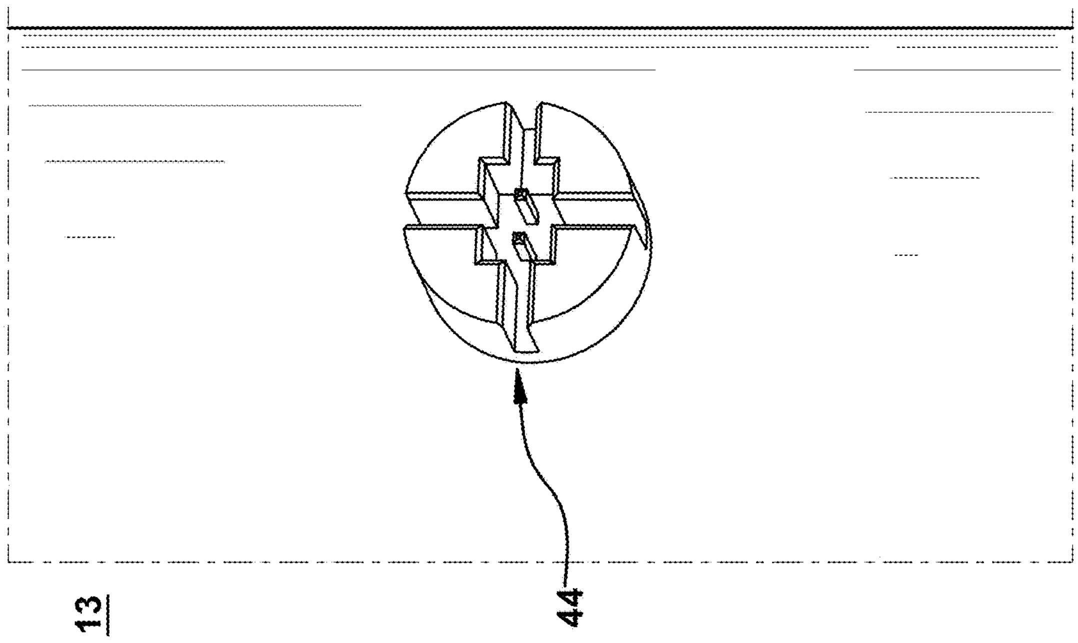
FIG. 8 depicts an alternative ignitor module installed in a firework according to embodiments.

FIG. 8 depicts an alternative configuration of the interface end of an ignitor module 13, shown installed in a firework. In this embodiment, rather than utilizing a hex bolt head, a round head is used having a recessed surface, in this case a crossed recess 44 that is adapted to receive a specialized tool (e.g., a screwdriver) to rotate and insert the module 10. It is understood that the described hex bolt head 20 and crossed recess head 44 are not intended to be limiting and other configurations may be utilized. For example, while the described embodiments allow the module 10 to be "screwed" into the firework with a tool, it is understood that the module 10 may include any configuration or shape to support or facilitate insertion into a firework. Other such configurations may, e.g., include a rivet that utilizes a rivet gun, a head with pin holes that can receive a tool for rotation, a geometric head with more or less than six sides, a knobbed head, a star-shaped head, a concave or convex head profile, a tapered shaft, an un-tapered shaft, a shaft with a speared or pointed end, a shaft with toggle wings or anchors, a head with grooves that support a hand or machine press, etc.

Further, while the illustrative embodiment of ignitor module 10 may be formed from plastic as a threaded bolt, it is understood that other materials and configurations could be utilized. For example, module 10 could be formed from glass, paper, wood, silicone, fiber, a plant-based substance, a composite material, metal, etc. Furthermore, rather than using a threaded bolt, the external surface of module 10 may be formed with a pointed conical profile or other profile adapted to penetrate a wall or surface of a firework and maintain module 10 securely in place. In some aspects, the firework may be manufactured with a small pilot hole in the wall or surface to enable easy insertion of module 10. In other aspects, module 10 may be configured to puncture the wall or surface of the firework without a pilot hole. In certain embodiments, the interface 22 may include a removable cover, e.g., a piece of tape or plastic shield, to protect module 10 prior to use. In other embodiments, firework 12 may include a removable cover over the access point 16 (FIG. 1), e.g., a piece of tape or plastic shield, to protect the firework prior to module 10 insertion.

Figure 9:
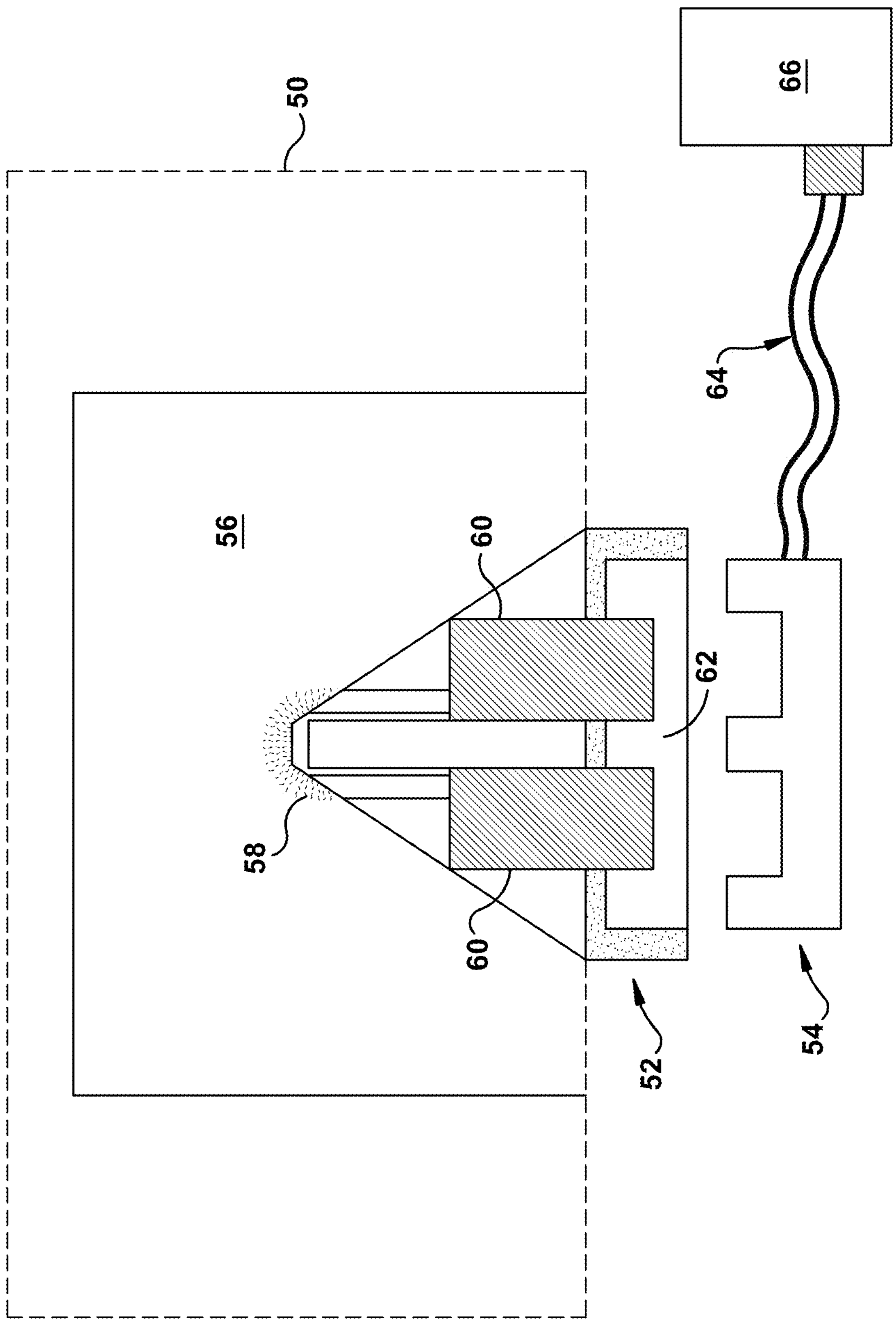
FIG. 9 depicts a further alternative ignitor module system according to embodiments.

FIG. 9 depicts a top view an alternative embodiment of an ignitor module 52 installed in a firework 50. In this embodiment, the ignitor module 52 does not itself contain a pyrotechnic material, but instead is configured to directly ignite the firework pyrotechnic material 56 in the firework 50. Similar to the above embodiments, the ignitor module 52 includes an interface 62 having metal contacts 60 and receives a plug 54 coupled to a firing module 66 via a pair of wires 64. In this case, the heating element 58 includes an exposed region that directly contacts (or is sufficiently proximate to) firework pyrotechnic material 56. In this embodiment, when electricity from the firing module 66 causes the heating element 58 to heat, it directly ignites the firework 50.

Figure 10B:
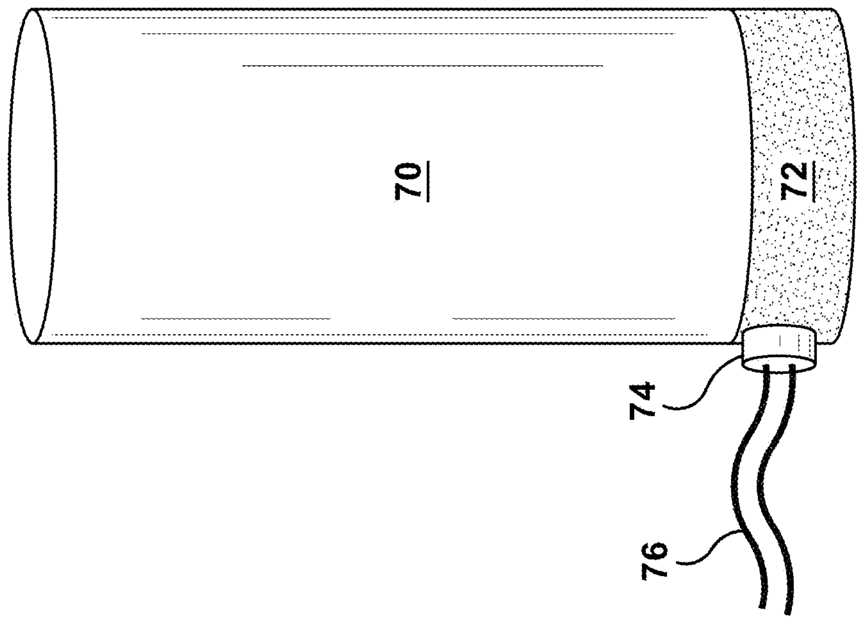
FIGS. 10*a* and 10*b* depict further alternative embodiments of an ignitor module.
Figure 10A:
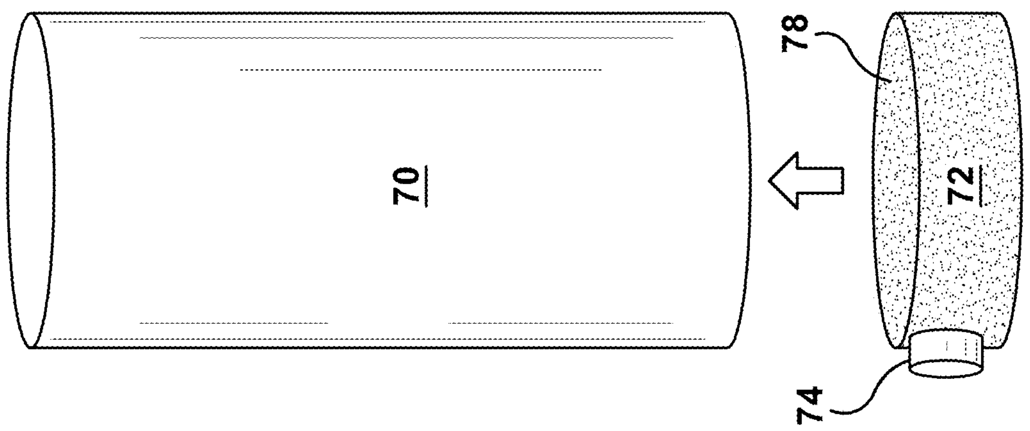

FIGS. 10*a* and 10*b* depict further embodiments of an alternative ignitor module 72. In this embodiment, the ignitor module 72 (as shown in FIG. 10*a*) is configured to attach to the bottom of a firework 70, e.g., using glue, clips, a lip, threading, etc. The ignitor module 72 may be attached to firework 70 during the firework manufacturing process, or thereafter. The ignitor module 72 may for example comprise a plastic container that fully incorporates an ignition system similar to module 10, e.g., including metal electrodes, a heating element (e.g., a coil), and an ignition element (e.g., a pyrotechnic material). In addition, ignitor module 72 includes an interface 74, i.e., universal receptacle, adapted to receive a wired plug 76, as shown in FIG. 10*b*. When the wired plug 76 is plugged into the interface 74 and an electrical current is passed therethrough from a firing module, the heating element ignites the pyrotechnic material in the module 72, which then ignites the firework 70. Although shown as a cylindrical shaped device that conforms to the bottom of the firework 70, it is understood that module 72 can comprise any shape or size that can readily attached to an outer surface of firework 70. It is also understood that module 72 can be made of any suitable material or materials, e.g., cardboard, glass, paper, wood, silicone, fiber, a plant-based substance, a composite material, metal, etc. Furthermore, it is understood that the interface region 78 of module 72 (i.e., where module 72 connects to firework 70) may be exposed or include a thin membrane of material to allow the pyrotechnic material contained therein to directionally blast (e.g., upward) and ignite the firework 70.

Note that while the described embodiments generally include a tungsten wire or the like to ignite powder, ignition of the firework (either via pyrotechnic material in the module or via direct ignition) may be implemented with any type of heating element that can convert electrical energy into heat energy. For example, a device that generates an electric or plasma arc can be utilized. Arcing is for example a known technology used in welding and spark plugs.

This novel igniter system significantly streamlines the set up and ignition process of fireworks shows, while enhancing safety by minimizing direct interaction with the firework. The system also eliminates the need for attaching talons to fuses, which can be time consuming and error prone.

In certain embodiments, fireworks incorporating ignitor modules described herein may be packaged with a firing system that for example includes one or more firing modules, wires/plugs, and a master controller and/or downloadable software for creating a firework show from a computer device, smartphone, etc.

In other embodiments, the ignitor module may include additional components to further enhance a firework show, e.g., an LED, specialized circuitry with a timing system, an audio output (e.g., a whistle, beep, or "fire in the hole"), etc.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to an individual in the art are included within the scope of the disclosure as defined by the accompanying claims.

What is claimed is:

1. An ignitor module insertable into a firework, comprising:

a first end having an interface configured for exposure on an exterior surface of the firework, the interface configured for receiving a plug;

a set of electrical contacts adapted to receive electrical current from the plug;

a heating element coupled to the electrical contacts and adapted to convert electrical energy to heat energy in response to receiving electrical current; and a second end having an ignition element adjacent to the heating element that includes an open cone-shaped cavity with a first opening located proximate the heating element at a first end and a second opening at an opposed end, wherein the open cone-shaped cavity is filled with a pyrotechnic material, the pyrotechnic material adapted to ignite in response to heat energy generated by the heating element.

2. The ignitor module of claim 1, wherein a shaft of the ignitor module is threaded.

3. The ignitor module of claim 2, wherein the first end is configured to receive a tool for rotating and inserting the ignitor module into the firework.

4. The ignitor module of claim 3, wherein the first end includes a hex bolt configuration.

5. The ignitor module of claim 3, wherein the exterior surface at the first end includes an open recess, wherein the open recess includes an exposed pair of metal pins within the open recess configured for receiving the plug.

6. The ignitor module of claim 5, wherein the exposed pair of metal pins do not extend beyond the exterior surface.

7. The ignitor module of claim 1, wherein the second opening at the opposed end of the open cone-shaped cavity includes an unobstructed path to trigger an initial effect of the firework.

8. The ignitor module of claim 1, wherein the heating element comprises a tungsten coil.

9. The ignitor module of claim 1, wherein the pyrotechnic material comprises a putty.

10. A firework, comprising:

an ignitor module insertable into a firework, having:

a first end having an interface configured for exposure on an exterior surface of the firework, the interface configured for receiving a plug;

a set of electrical contacts adapted to receive electrical current from the plug;

a heating element coupled to the electrical contacts and adapted to convert electrical energy into heat energy in response to receiving electrical current; and a second end having an ignition element located adjacent to the heating element that includes an open cavity with a first opening located proximate the heating element at a first end and a second opening at an opposed end, wherein the open cavity is filled with a pyrotechnic material, the pyrotechnic material adapted to ignite in response to heat energy generated by the heating element to ignite an initial effect of the firework via the second opening.

11. The firework of claim 10, wherein a shaft of the ignitor module is threaded.

12. The firework of claim 11, wherein the first end is configured to receive a tool for rotating and inserting the ignitor module into the firework.

13. The firework of claim 12, wherein the first end includes a hex bolt configuration.

14. The firework of claim 12, wherein the exterior surface at the first end includes an open recess, wherein the open recess includes an exposed pair of metal pins within the open recess configured for receiving the plug.

15. The firework of claim 14, wherein the exposed pair of metal pins do not extend beyond the exterior surface.

16. The firework of claim 10, wherein the second opening at the opposed end of the open cavity includes an unobstructed path to trigger the initial effect of the firework.

17. The firework of claim 10, wherein the heating element comprises a tungsten coil.

18. The firework of claim 10, wherein the pyrotechnic material comprises a putty.

19. An ignitor module insertable into a firework, comprising:

a first end having an interface configured for exposure on an exterior surface of the firework, the interface configured for receiving a plug;

a set of electrical contacts adapted to receive electrical current from the plug;

a second end having an open cavity exposed to a tungsten coil, wherein the tungsten coil is coupled across the electrical contacts, and wherein the tungsten coil extends outwardly from the electrical contacts and is adapted to generate heat in response to receiving electrical current; and wherein the tungsten coil is configured to directly ignite pyrotechnic material in the open cavity.

20. The ignitor module of claim 19, wherein a shaft of the ignitor module is threaded.

* * * * *